(12) United States Patent
Chadha

(10) Patent No.: US 7,516,430 B2
(45) Date of Patent: Apr. 7, 2009

(54) GENERATING TESTCASES BASED ON NUMBERS OF TESTCASES PREVIOUSLY GENERATED

(75) Inventor: Sundeep Chadha, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 430 days.

(21) Appl. No.: 11/021,525

(22) Filed: Dec. 23, 2004

(65) Prior Publication Data

US 2006/0143582 A1    Jun. 29, 2006

(51) Int. Cl.
G06F 17/50 (2006.01)
G06F 17/10 (2006.01)

(52) U.S. Cl. .................. 716/5; 716/1; 716/2; 716/3; 716/4; 703/2; 703/14; 703/17

(58) Field of Classification Search .............. 716/1, 716/4, 6, 15; 717/124; 714/38, 738; 703/2, 703/14, 17; 702/194
See application file for complete search history.

(56) References Cited

U.S. PATENT DOCUMENTS

| | | | | |
|---|---|---|---|---|
| 5,631,857 | A * | 5/1997 | Kobrosly et al. ............ | 702/194 |
| 6,212,667 | B1 * | 4/2001 | Geer et al. ................. | 716/6 |
| 6,427,223 | B1 * | 7/2002 | Kim et al. .................. | 716/4 |
| 6,523,151 | B2 * | 2/2003 | Hekmatpour ............... | 716/4 |
| 6,782,518 | B2 * | 8/2004 | Decker ....................... | 716/5 |
| 6,804,634 | B1 * | 10/2004 | Holzmann et al. .......... | 703/2 |
| 6,975,976 | B1 * | 12/2005 | Casavant et al. ............ | 703/14 |
| 6,993,470 | B2 * | 1/2006 | Baumgartner et al. ...... | 703/17 |
| 7,007,251 | B2 * | 2/2006 | Hekmatpour ............... | 716/4 |
| 7,051,301 | B2 * | 5/2006 | Thompson et al. .......... | 716/4 |
| 7,092,868 | B2 * | 8/2006 | Gabele et al. .............. | 703/22 |
| 7,114,111 | B2 * | 9/2006 | Noy .......................... | 714/738 |
| 7,120,890 | B2 * | 10/2006 | Urata et al. ................ | 716/12 |
| 7,181,376 | B2 * | 2/2007 | Fine et al. .................. | 703/2 |
| 7,206,732 | B2 * | 4/2007 | Williams et al. ........... | 703/22 |
| 7,278,056 | B2 * | 10/2007 | Hekmatpour ............... | 714/37 |
| 7,292,970 | B1 * | 11/2007 | Hurlock .................... | 703/23 |
| 7,308,658 | B2 * | 12/2007 | Wood et al. ................ | 716/4 |

(Continued)

OTHER PUBLICATIONS

Rothermel et al., "Prioritizing test cases for regression testing", Oct. 2001, Software Engineering, IEEE Transactions on☐☐vol. 27, Issue 10, pp. 929-948.*

(Continued)

*Primary Examiner*—Helen Rossoshek
(74) *Attorney, Agent, or Firm*—Owen J. Gamon

(57) ABSTRACT

A method, apparatus, system, and signal-bearing medium that, in an embodiment, receive elements and a goal for each of the elements. In various embodiments, the elements may represent commands or parameter values for a device to be tested. Testcases are generated based on the elements. If the numbers of testcases for the elements are equally distant from their goals, then a new testcase is generated based on an element chosen at random. But, if the numbers of testcases are not equally distant from their goals, then the new testcase is generated based on the element whose number of testcases if furthest from its respective goal. The number of testcases associated with the chosen element is then incremented, and the process is repeated. In this way, the generated testcases are based on the numbers of previously generated testcases, which, in an embodiment, results in more complete coverage of testcases for the device under test.

11 Claims, 3 Drawing Sheets

U.S. PATENT DOCUMENTS

| | | | |
|---|---|---|---|
| 7,320,090 B2* | 1/2008 | Coulter et al. | 714/30 |
| 2005/0081109 A1* | 4/2005 | Czerwonka | 714/38 |
| 2005/0160321 A1* | 7/2005 | Cleaveland et al. | 714/38 |
| 2006/0010428 A1* | 1/2006 | Rushby et al. | 717/124 |
| 2006/0143582 A1* | 6/2006 | Chadha | 716/4 |

OTHER PUBLICATIONS

Cunning et al., "Automatic test case generation from requirements specifications for real-time embedded systems", Oct. 12-15, 1999, Systems, Man, and Cybernetics, 1999. IEEE SMC '99 Conference Proceedings. 1999 IEEE International Conference on, vol. 5, pp. 784-789 vol. 5.*

Memon et al., "DART: a framework for regression testing "nightly/daily builds" of GUI applications", Sep. 22-26, 2003, Software Maintenance, ICSM 2003. Proceedings. International Conference on, pp. 410-419.*

Fallah et al.; "OCCOM-efficient computation of observability-based code coverage metrics for functional verification"; Aug. 2001; Computer-Aided Design of Integrated Circuits and Systems, IEEE Transactions on; vol. 20, Issue 8, pp. 1003-1015.*

Braun et al.; "Enhancing the efficiency of Bayesian network based coverage directed test generation"; Nov. 10-12, 2004;☐☐High-Level Design Validation and Test Workshop, 2004. Ninth IEEE International; pp. 75-80.*

Devadas et al.; "An observability-based code coverage metric for functional simulation"; Nov. 10-14, 1996; Computer-Aided Design, 1996. ICCAD-96. Digest of Technical Papers., 1996 IEEE/ACM International Conference on; pp. 418-425.*

Kang et al.; "Automatic error pattern generation for design error detection in a design validation simulation system"; Sep. 21-25, 1992; ASIC Conference and Exhibit, 1992., Proceedings of Fifth Annual IEEE International; pp. 533-536.*

\* cited by examiner

| ELEMENT | NUMBER OF TESTCASES PREVIOUSLY GENERATED | GOAL NUMBER OF TESTCASES |
|---|---|---|
| READ | 5 | 100 |
| WRITE | 4 | 100 |

ELEMENT DATA

FIG. 2

GENERATING TESTCASES BASED ON NUMBERS OF TESTCASES PREVIOUSLY GENERATED

FIELD

This invention generally relates to verification of a hardware or software design and more specifically relates to generating testcases based on the numbers of testcases previously generated.

BACKGROUND

The development of the EDVAC computer system of 1948 is often cited as the beginning of the computer era. Since that time, computer systems have evolved into extremely sophisticated devices that may be found in many different settings. Computer systems typically include a combination of hardware (e.g., semiconductors, integrated circuits, circuit boards, etc.) and software (e.g., computer programs).

The typical design methodology for integrated circuit designs—such as very large scale integrated (VLSI) circuits and application specific integrated circuits (ASICs)—is conventionally divided into the following three stages. First, a design capture step is performed using, for example, a high-level language synthesis package. Next, design verification is made on the resulting design. This includes simulations, timing analysis, and automatic test pattern generation (ATPG) tools. Finally, there is layout and eventual tape out of the device. The device is then tested, and the process may need to be reiterated one or more times until the desired design criteria are satisfied.

The design capture step typically involves the specification of a logic circuit by a designer. A hardware description language ("HDL") provides the designer with a mechanism for describing the operation of the desired logic circuit in a technology-independent manner.

Automated software tools available from companies such as Cadence Design Systems and Synopsys take an HDL description of the integrated circuit (sometimes referred to as a behavioral or register-transfer-level description) and map it into an equivalent netlist composed of the standard cells from a selected standard cell library. This process is commonly known as "synthesis."

A netlist is a data structure representation of the electronic logic system that comprises a set of modules, each of which comprises a data structure that specifies sub-components and their interconnection. The netlist describes the way standard cells and blocks are interconnected. Netlists are typically available in Verilog, EDIF (Electronic Design Interchange Format), or VHDL (Very High Speed Integrated Circuit Hardware Design Language) formats. Other software tools available from companies such as Cadence or Synopsys take a netlist comprised of standard cells and create a physical layout of the chip by placing the cells relative to each other to minimize timing delays or wire lengths, and then create electrical connections (or routing) between the cells to physically complete the desired circuit. Once a netlist has been generated from the logic design, silicon compilers, also called place and route tools, convert the netlist into a semiconductor circuit layout. The semiconductor circuit layout specifies the physical implementation of the circuit in silicon or other semiconductor materials.

Design verification involves verifying that the logic definition is correct, that the circuit implements the function expected by the designers, and that the many optimizations and transformations introduced during the design process do not alter the intended logical function of the design. Design verification typically occupies a large portion of the schedule for any chip development cycle. Design verification may involve timing analysis and simulation tools. The data representation in the logic design database may be reformatted as needed prior to use by the timing analysis and simulation tools. The design undergoes design verification analysis in order to detect flaws in the design. The design is also analyzed using simulation tools to assess the functionality of the design. If errors are found or the resulting functionality is unacceptable, the designer modifies the design as needed. These design iterations help to ensure that the design satisfies its requirements. Formal verification (property checking) may also be used to prove correct behavior for selected aspects of the design. Formal verification is a technique that models a logic circuit as a state transition system using specifications for components in the system.

Another verification method is to generate large numbers of testcases or test programs. A traditional strategy is to manually write directed testcases that exercise specified parts of the design and run those testcases on a simulator that models the device operation. Writing such testcases is very time consuming and lacks random testing, which means covering all the legal or valid combinations of stimuli may be difficult. Also, the testcases written in this way are difficult to maintain because they lack portability and are vulnerable to any and all design changes, which causes significant modifications to the testcase bucket or regression test suite for almost every design change.

Another approach to creating testcases is to use a random testcase generator, which is often a script written in any high level language (e.g., C, C++, Perl, etc) that requires the verification engineer to provide some input as to what type of testcase is required. The testcase generator than randomly generates testcases based on the input type. "Type" means the commands, legal or valid ranges, and/or values for various parameters that need to be varied/changed in order to test the design. The type may be passed to the testcase generator as a file (e.g., a parameter file). The valid commands, parameter ranges, and/or values are defined based on the design specification and the directedness of the testcases required. This approach, besides providing comparatively increased random testing, also reduces the time required to generate testcase buckets or regression test suites because the job of the verification engineer is now merely to provide the constraints to the testcase generator after understanding the design specifications and verification environment. A few handwritten directed testcases may still be required to cover specific logic areas of the design.

Although testcase generators can enable testing that is more random and easier to modify, they still rely on the pseudo-randomness of the particular testcase generator. This can be a problem, as shown below, by observing that the testcases generated, even when employing a fairness algorithm, are not always as random as the verification engineer would hope. That is, a mismatch can occur in the generated commands/ranges/values in the testcase versus the expected commands/ranges/values.

To understand this mismatch, consider the following example: the verification engineer's objective is to generate a number ("n") testcases where n/2 should be read testcases and the other n/2 should be write testcases. Unfortunately, a testcase generator using an algorithm with a 50% probability of choosing a read testcase and a 50% probability of choosing a write testcase actually has only a 31.25% probability of generating equal number of reads and writes when n=6 and only a 14.44% probability of generating equal numbers of reads and writes when n=30. Hence, relying on a fairness algorithm of the typical testcase generator is not sufficient to meet the verification engineer's objective.

The calculations that result in the aforementioned 31.25% and 14.44% are as follows. For a sequence of n=6 testcases, each needing to choose between two equally probable choices, reads or writes, the total possibilities of testcase combinations are $2^6$=64. Out of these 64 combinations, the only combinations of interest are the ones that have exactly 3 reads and 3 writes. Thus, the number of combinations of interest is: 6C3=[6!]/[3!×3!]=720/(6×6)=20. Finally, the probability of generating exactly 3 reads and 3 writes is: 20/64×100=31.25%.

Similarly, for a sequence of 30 testcases, each needing to choose between two equally probable choices, reads or writes, the total possibilities of testcase combinations are $2^{30}$=1,073,741,824. Out of these 1,073,741,824 combinations, the only combinations of interest are the ones that have exactly 15 reads and 15 writes. Thus, the number of combinations of interest is: 30C15=[30!]/[15!×15!]=155,117,520. Finally, the probability of generating exactly 15 reads and 15 writes is: [155,117,520]/[1,073,741,824]×100=14.44%.

Thus, without a better way to generate testcases, testing of devices will continue to suffer with a lack of complete coverage. Although the aforementioned problems have been described in the context of a netlist, they may occur in any type of device under test, whether a simulated device, a software program, or a hardware device.

SUMMARY

A method, apparatus, system, and signal-bearing medium are provided that, in an embodiment, receive elements and a goal for each of the elements. In various embodiments, the elements may represent commands or parameter values for a device to be tested. Testcases are generated based on the elements. If the numbers of testcases for the elements are equally distant from their goals, then a new testcase is generated based on an element chosen at random. But, if the numbers of testcases are not equally distant from their goals, then the new testcase is generated based on the element whose number of testcases is furthest from its respective goal. The number of testcases associated with the chosen element is then incremented, and the process is repeated. In this way, the generated testcases are based on the numbers of previously generated testcases, which, in an embodiment, results in more complete coverage of testcases for the device under test.

BRIEF DESCRIPTION OF THE DRAWINGS

Various embodiments of the present invention are hereinafter described in conjunction with the appended drawings:

FIG. 2 depicts a block diagram of an example data structure for element data, according to an embodiment of the invention.

It is to be noted, however, that the appended drawings illustrate only example embodiments of the invention, and are therefore not considered limiting of its scope, for the invention may admit to other equally effective embodiments.

DETAILED DESCRIPTION

In an embodiment, a testcase generator receives elements and a goal for each of the elements. The testcase generator generates testcases based on the elements. If the numbers of testcases for the elements are equally distant from their goals, then a new testcase is generated based on an element chosen at random. But, if the numbers of testcases are not equally distant from their goals, then the new testcase is generated based on the element whose number of testcases is furthest from its respective goal. The number of testcases associated with the chosen element is then incremented, and the process is repeated. In this way, the generated testcases are based on the numbers of previously generated testcases, which, in an embodiment, results in more complete coverage of testcases for the device to be tested using the testcases.

Figure 1:
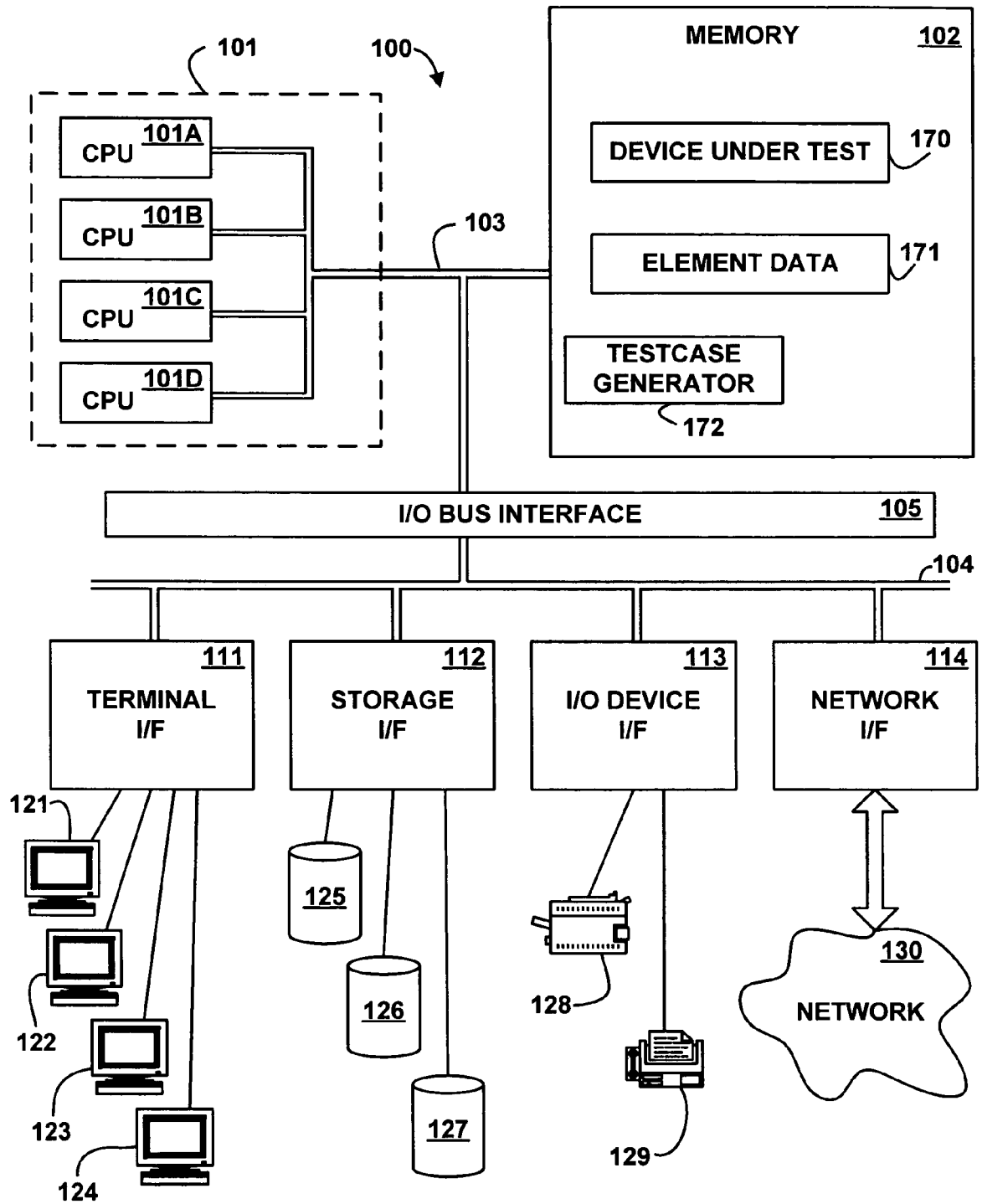
FIG. 1 depicts a high-level block diagram of an example system for implementing an embodiment of the invention.

Referring to the Drawings, wherein like numbers denote like parts throughout the several views, FIG. 1 depicts a high-level block diagram representation of a computer system 100 connected to a network 130, according to an embodiment of the present invention. In an embodiment, the hardware components of the computer system 100 may be implemented by an IBM eServer iSeries computer system. However, those skilled in the art will appreciate that the mechanisms and apparatus of embodiments of the present invention apply equally to any appropriate computing system.

The major components of the computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory for storing data and programs. In another embodiment, the main memory 102 represents the entire virtual memory of the computer system 100, and may also include the virtual memory of other computer systems coupled to the computer system 100 or connected via the network 130. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 102 includes a device under test 170, element data 171, and a testcase generator 172. Although the device under test 170, the element data 171, and the testcase generator 172 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the device under test 170, the element data 171, and the testcase generator 172 are illustrated as being contained within the main memory 102, these elements are not necessarily all completely contained in the same storage device at the same time.

Further, although the device under test 170, the element data 171, and the testcase generator 172 are illustrated as being separate entities, in other embodiments some of them, or portions of some of them, may be packaged together. For example, in an embodiment, the element data 171 and the testcase generator 172 may be packaged together.

The device under test 170 may be represented as a netlist or any other appropriate format or data simulation of a circuit, chip, card, or other hardware device. In another embodiment, the device under test 170 may be software program including instructions capable of executing on a processor, e.g., the processor 101, or statements capable of being interpreted by code that executes on a processor, e.g., the processor 101. Although the device under test 170 is illustrated as being contained in the memory 102, in another embodiment, the device under test 170 may be a physical hardware device that is connected to the testcase generator 172 via the system I/O bus 104, a cable, or other hardware mechanism.

The element data 171 is a data structure used by the testcase generator 172 to generate testcases for the device under test 170. The element data 171 is further described below with reference to FIG. 2.

In an embodiment, the testcase generator 172 includes instructions capable of executing on the processor 101 or statements capable of being interpreted by instructions executing on the processor 101 to perform the functions as further described below with reference to FIG. 3. In another embodiment, the testcase generator 172 may be implemented in microcode. In another embodiment, the testcase generator 172 may be implemented in hardware via logic gates and/or other appropriate hardware techniques.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI bus, or any other appropriate bus technology.

The I/O interface units support communication with a variety of storage and I/O devices. For example, the terminal interface unit 111 supports the attachment of one or more user terminals 121, 122, 123, and 124. The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the main memory 102 may be stored to and retrieved from the direct access storage devices 125, 126, and 127.

The I/O and other device interface 113 provides an interface to any of various other input/output devices or devices of other types. Two such devices, the printer 128 and the fax machine 129, are shown in the exemplary embodiment of FIG. 1, but in other embodiment many other such devices may exist, which may be of differing types. The network interface 114 provides one or more communications paths from the computer system 100 to other digital devices and computer systems; such paths may include, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

The computer system 100 depicted in FIG. 1 has multiple attached terminals 121, 122, 123, and 124, such as might be typical of a multi-user "mainframe" computer system. Typically, in such a case the actual number of attached devices is greater than those shown in FIG. 1, although the present invention is not limited to systems of any particular size. The computer system 100 may alternatively be a single-user system, typically containing only a single user display and keyboard input, or might be a server or similar device which has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100. In various embodiments, the network 130 may represent a storage device or a combination of storage devices, either connected directly or indirectly to the computer system 100. In an embodiment, the network 130 may support Infiniband. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol).

In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number (including zero) of networks (of the same or different types) may be present.

It should be understood that FIG. 1 is intended to depict the representative major components of the computer system 100 and the network 130 at a high level, that individual components may have greater complexity that represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system 100, and that, when read and executed by one or more processors 101 in the computer system 100, cause the computer system 100 to perform the steps necessary to execute steps or elements comprising the various aspects of an embodiment of the invention.

Moreover, while embodiments of the invention have and hereinafter will be described in the context of fully-functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 via a variety of signal-bearing media, which include, but are not limited to:

(1) information permanently stored on a non-rewriteable storage medium, e.g., a read-only memory device attached to or within a computer system, such as a CD-ROM, DVD-R, or DVD+R;

(2) alterable information stored on a rewriteable storage medium, e.g., a hard disk drive (e.g., the DASD 125, 126, or 127), CD-RW, DVD-RW, DVD+RW, DVD-RAM, or diskette; or (3) information conveyed by a communications medium, such as through a computer or a telephone network, e.g., the network 130, including wireless communications.

Such signal-bearing media, when carrying machine-readable instructions that direct the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying software systems and web services that implement, some or all of the methods described herein. Aspects of these embodiments may also include analyzing the client company, creating recommendations responsive to the analysis, generating software to implement portions of the recommendations, integrating the software into existing processes and infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
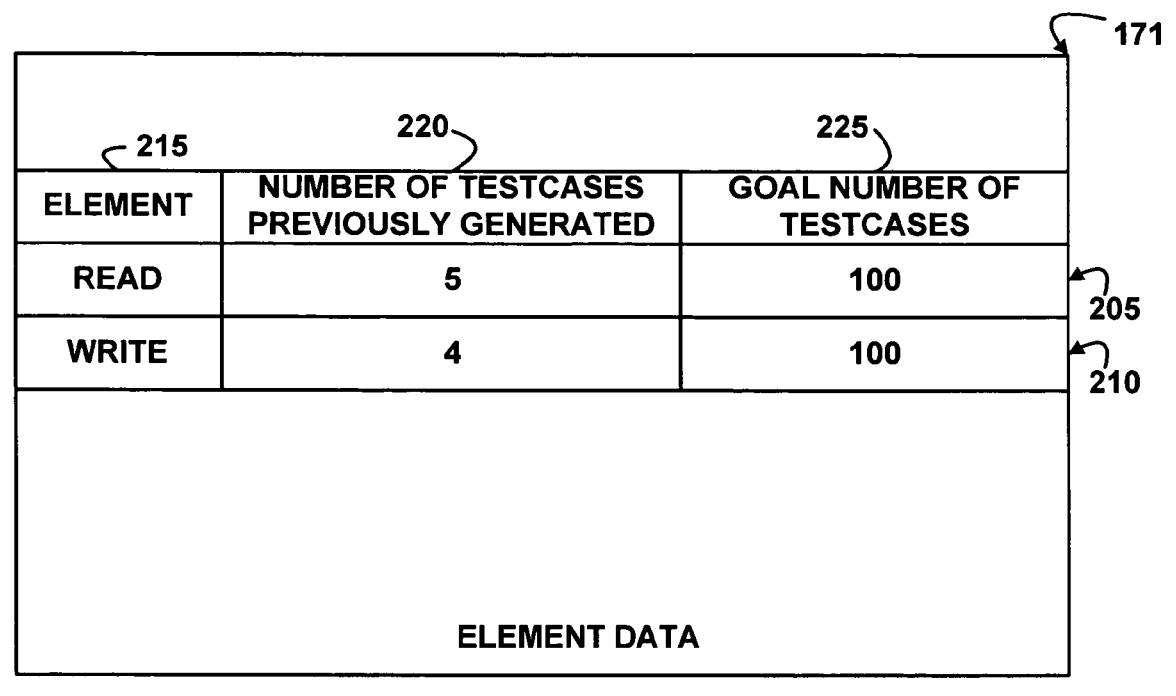

FIG. 2 depicts a block diagram of an example data structure for the element data 171, according to an embodiment of the invention. The element data 171 includes records 205 and 210, but in other embodiments any number of records with any appropriate data may be present. Each of the records 205 and 210 includes an element field 215, a number of testcases previously generated 220, and a goal number of testcases 225. The element field 215 identifies types of testcases to generate. Types of testcases include commands, valid or invalid ranges and/or values for various parameters, or any other stimuli that need to be varied/changed in order to test the design of the device under test 170.

The number of testcases previously generated field 220 indicates the number of testcases already generated for the type identified in the associated element field 215 of the same record. The goal number of testcases field 225 indicates the goal number of testcases to generate for the associated element field 215 of the same record. Although FIG. 2 illustrates both of the goal number of testcases 225 in the record 205 and 210 as being identical, in other embodiments some or all of the goal number of testcases 225 may be different.

Figure 3:
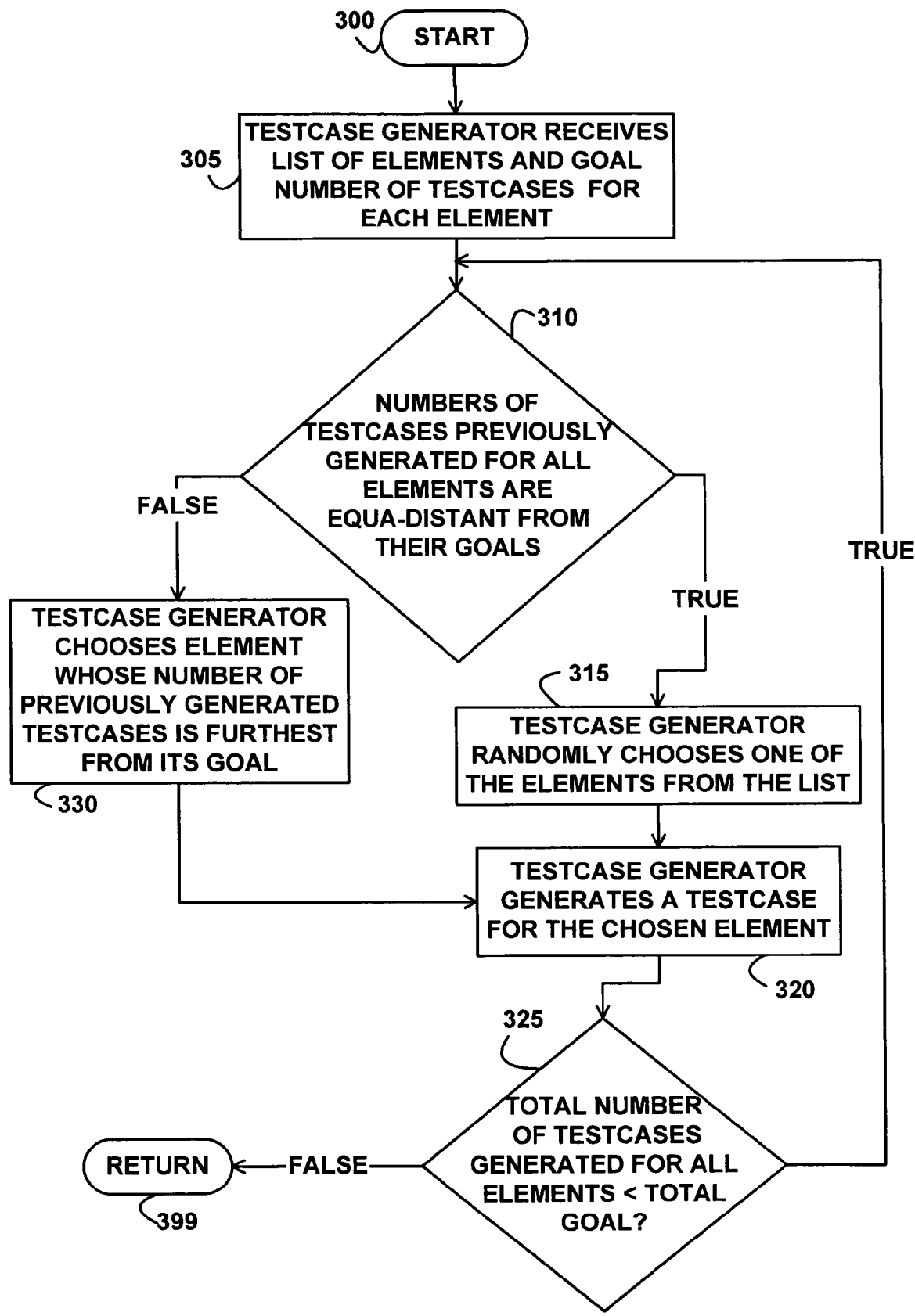
FIG. 3 depicts a flowchart of example processing for a testcase generator using the element data, according to an embodiment of the invention.

FIG. 3 depicts a flowchart of example processing for generating testcases directed to the device under test 170 via the testcase generator 172 using the element data 171, according to an embodiment of the invention. Control begins at block 300. Control then continues to block 305 where the testcase generator 172 receives a list of elements and a goal number of testcases for each of the elements. In various embodiments, the testcase generator 172 may receive the list of elements and the goal number of testcases from, e.g., one of the terminals 121, 122, 123, 124, via the network 130, or via an unillustrated program in the memory 102. The testcase generator 172 creates a new record for each of the received elements in the element data 171 and stores the elements in the element field 215 of the respective records, e.g., the records 205 and 210, as previously described above with reference to FIG. 2. The testcase generator 172 further stores the received goal number of testcases in the respective goal number of testcases fields 225 in the created records. The testcase generator 172 further initializes the number of testcases previously generated fields 220 in each of the created records to zero since no testcases have yet been generated.

Control then continues to block 310 where the testcase generator 172 determines whether the number of testcases previously generated for all the elements are equal distance from their goals. The testcase generator 172 makes the determination at block 310 by examining the difference between the number of testcases previously generated 220 and the goal number of testcases 225 for each of the records in the element data 171 and then comparing all of the differences for the records.

If the determination at block 310 is true, then the number of testcases previously generated 220 for all the elements 215 are an equal distance from their goals 225, so control continues to block 315 where the testcase generator 172 randomly chooses one of the elements from the received list (one of the elements 215 in one of the records in the element data 171). In an embodiment, the testcase generator 172 uses a pseudo-random number generator to randomly choose one of the elements 215. Control then continues to block 320 where the testcase generator 172 generates a testcase for the chosen element 215 for the purpose of testing the device under test 170. The testcase generator 172 further increments the number of testcases previously generated 220 for the record in the element data 171 associated with the chosen element 215.

Control then continues to block 325 where the testcase generator 172 determines whether the total number of testcases generated for all elements (the sum of all fields 220 in all records in the element data 171) is less than the total goal number of testcases (the sum of all the fields 225 in all records in the element data 171). If the determination at block 325 is true, then the total number of testcases generated for all elements 215 is less than the total goal number of testcases and more testcases are needed, so control returns to block 310, as previously described above.

If the determination at block 325 is false, then the total number of testcases generated for all elements 215 is not less than the total goal number of testcases and more testcases are not needed, so control returns to block 399 where the logic of FIG. 3 returns.

If the determination at bock 310 is false, then the number of testcases previously generated for all the elements 215 are not an equal distance from their respective goals 225, so control continues to block 330 where the testcase generator 172 chooses a record in the element data 171 having an element 215 whose number of previously generated testcases 220 is furthest from its goal number of testcases 225 when compared to the other records in the element data 171. Control then continues to block 320, as previously described above.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of embodiments of the invention. But, the invention may be practiced without these specific details. In other instances, well-known circuits, structures, and techniques have not been shown in detail in order not to obscure the invention.

What is claimed is:

1. A method comprising:
   receiving a plurality of elements and a plurality of respective goals for each of the elements;
   generating a plurality of testcases based on the plurality of elements, wherein each of the plurality of elements has an associated number of the testcases less than their respective goal, wherein each of the plurality of respective goals comprises a respective goal number of the testcases;
   determining whether the numbers of testcases are equally distant from their respective goal number of the testcases;
   if the numbers of the testcases are equally distant from their respective goal number of the testcases, choosing a first element of the plurality of elements at random and generating a new testcase based on the first element, wherein the new testcase exercises a design of a device; and
   if the numbers of the testcases are not equally distant from their respective goal number of the testcases, choosing a second element of the plurality of elements whose number of the testcases is furthest from its respective goal and generating the new testcase based on the second element.

2. The method of claim 1, further comprising:
   if the numbers of the testcases are not equally distant from their respective goal number of the testcases, incrementing the number of testcases associated with the second element and repeating the determining.

3. The method of claim 1, further comprising:
   if the numbers of the testcases are equally distant from their respective goal number of the testcases, incrementing the number of testcases associated with the first element and repeating the determining.

4. The method of claim 1, wherein the plurality of elements comprise a plurality of parameter values for a device to be tested.

5. The method of claim 1, wherein the plurality of elements comprise a plurality of commands for a device to be tested.

6. The method of claim 1, wherein the plurality of elements comprise a plurality of commands and a plurality of parameter values for a device to be tested.

7. A computer configured to execute a program stored in a computer readable medium to storage device perform a method, comprising:
   configuring the computer to receive a plurality of elements and a plurality of respective goals for each of the elements;
   configuring the computer to generate a plurality of testcases based on the plurality of elements, wherein each of the plurality of elements has a number of the testcases less than their respective goal, wherein each of the plurality of respective goals comprises a respective goal number of the testcases;
   configuring the computer to determine whether the numbers of testcases are equally distant from their respective goal number of the testcases;
   configuring the computer to choose a first element of the plurality of elements at random and generate a new testcase based on the first element if the numbers of the testcases are equally distant from their respective goal number of the testcases, wherein the new testcase exercises a design of a device; and
   configuring the computer to choose a second element of the plurality of elements whose number of the testcases is furthest from its respective goal and generate the new testcase based on the second element if the numbers of the testcases are not equally distant from their respective goal number of the testcases.

8. The method of claim 7, further comprising:
   configuring the computer to increment the number of testcases associated with the first element and repeat the determining if the numbers of the testcases are equally distant from their respective goal number of the testcases.

9. The method of claim 7, further comprising:

configuring the computer to increment the number of testcases associated with the second element and repeat the determining if the numbers of the testcases are not equally distant from their respective goal number of the testcases.

10. The method of claim 7, wherein the plurality of elements comprise a plurality of parameter values for a device to be tested.

11. The method of claim 7, wherein the plurality of elements comprise a plurality of commands for a device to be tested.

* * * * *